US009633196B2

(12) United States Patent
Lin et al.

(10) Patent No.: US 9,633,196 B2
(45) Date of Patent: Apr. 25, 2017

(54) ELECTRONIC SYSTEM, ELECTRONIC APPARATUS AND ACCESS AUTHENTICATION METHOD THEREOF

(71) Applicant: Wistron Corporation, New Taipei (TW)

(72) Inventors: Yu-Ta Lin, New Taipei (TW); Chun-Yen Chang, New Taipei (TW); Wen-Yang Wu, New Taipei (TW); Tzu-Yi Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 70 days.

(21) Appl. No.: 14/639,127

(22) Filed: Mar. 5, 2015

(65) Prior Publication Data

US 2016/0147675 A1   May 26, 2016

(30) Foreign Application Priority Data

Nov. 26, 2014   (TW) .............................. 103140974 A (51) Int. Cl.
*G06F 12/00*   (2006.01)
*G06F 21/44*   (2013.01)
*G06F 21/62*   (2013.01)

(52) U.S. Cl.
CPC .......... *G06F 21/44* (2013.01); *G06F 21/6218* (2013.01)

(58) Field of Classification Search
CPC ......................... G06F 12/1466; G06F 12/1408
USPC .................................................. 711/163, 164
See application file for complete search history.

(56) References Cited

U.S. PATENT DOCUMENTS

| 8,528,096 | B2 * | 9/2013 | Fruhauf | .................. G06F 21/78 713/170 |
| 9,165,133 | B2 * | 10/2015 | La Fever | ................. G06F 21/44 |
| 9,448,950 | B2 * | 9/2016 | Scarlata | ............. G06F 12/1466 |
| 2005/0169118 | A1 * | 8/2005 | You | ................... G11B 20/00086 369/30.05 |
| 2007/0083939 | A1 * | 4/2007 | Fruhauf | .................. G06F 21/78 726/34 |
| 2008/0148059 | A1 * | 6/2008 | Shapiro | ................... G06F 21/32 713/186 |

(Continued)

FOREIGN PATENT DOCUMENTS

| TW | 200521871 | 7/2005 |
| TW | 200928739 | 7/2009 |

OTHER PUBLICATIONS

"Office Action of Taiwan Counterpart Application" with partial English translation, issued on Nov. 2, 2015, p. 1-p. 9, in which the listed references were cited.

*Primary Examiner* — Pierre-Michel Bataille
(74) *Attorney, Agent, or Firm* — Jianq Chyun IP Office (57) ABSTRACT

An electronic system, an electronic apparatus, and an access authentication method thereof are provided. The electronic system includes a master apparatus and a slave apparatus. The slave apparatus is coupled to the master apparatus through a serial transmission interface. The slave apparatus includes a data storage unit protected by the slave apparatus with a predetermined key. The master apparatus sends an access request to the data storage unit through the serial transmission interface. The slave apparatus determines whether the master apparatus is allowed to access the data storage unit according to the predetermined key and a key inputted by the master apparatus for authentication.

11 Claims, 4 Drawing Sheets

(56) References Cited

U.S. PATENT DOCUMENTS

2010/0287382 A1* 11/2010 Gyorffy ................ G06F 21/36
    713/185
2014/0068238 A1* 3/2014 Jaber .................... G06F 21/575
    713/2

* cited by examiner

ELECTRONIC SYSTEM, ELECTRONIC APPARATUS AND ACCESS AUTHENTICATION METHOD THEREOF

CROSS-REFERENCE TO RELATED APPLICATION

This application claims the priority benefit of Taiwan application serial no. 103140974, filed on Nov. 26, 2014. The entirety of the above-mentioned patent application is hereby incorporated by reference herein and made a part of this specification.

BACKGROUND OF THE INVENTION

Field of the Invention

The invention relates to a data access technique, and more particularly relates to an electronic apparatus with a security authentication mechanism and an access authentication method thereof.

Description of Related Art

Inter-IC Bus ($I^2C$) refers to two-wire bus technology which allows integrated circuits in a system to communicate with each other and has a software-defined protocol. Because of the characteristics of simplicity and universality, the Inter-IC Bus has become a global industrial standard for system control and it is applicable to areas, such as temperature sensing, voltage level translator, electrically erasable programmable read only memory (EEPROM), general purpose I/O, A/D and D/A converter, CODEC, and various microprocessors.

Apparatuses that use the Inter-IC Bus can be divided into a master apparatus and a slave apparatus, which can be connected in parallel simply through a serial data line and a serial clock line. The master apparatus is a central processor, and the slave apparatus is an IC apparatus that is under control, for example. Signal variations of the serial data line and the serial clock line are combined into different signals for the master apparatus and the slave apparatus to communicate with each other through the bus.

However, generally multiple master apparatuses and multiple slave apparatuses may be disposed on the same Inter-IC Bus. When the addresses of these apparatuses are close to each other, due to the influences of signal attenuation, signal interference, and software design errors, the slave apparatus may be improperly written or read by the master apparatus, which causes the slave apparatus to execute an improper write/read access operation, or even causes instability or errors of the function and operation of the system. Although the current technology can use the write protect pin in the general purpose input/output (GPIO) interface to receive the control signal of the master apparatus or other circuits to endow the slave apparatus with the anti-write function, it can be achieved only through external control.

SUMMARY OF THE INVENTION

An embodiment of the invention provides an electronic system, an electronic apparatus, and an access authentication method thereof for a slave apparatus to execute an authentication mechanism on an access request of a master apparatus, so as to prevent the master apparatus from performing a malicious or erroneous access operation.

The invention provides an electronic system. The electronic system includes a master apparatus and a slave apparatus. The slave apparatus is coupled to the master apparatus through a serial transmission interface and includes a data storage unit protected by the slave apparatus with a predetermined key. The master apparatus sends an access request for accessing the data storage unit to the slave apparatus through the serial transmission interface. The slave apparatus determines whether the master apparatus is allowed to access the data storage unit according to the predetermined key and a key inputted by the master apparatus for authentication.

The invention provides an electronic apparatus. The electronic apparatus includes a data storage unit and a processing unit. The processing unit is coupled to the data storage unit, and protects the data storage unit with a predetermined key and receives an access request the master apparatus sends for accessing the data storage unit through the serial transmission interface. The processing unit determines whether the master apparatus is allowed to access the data storage unit according to the predetermined key and a key inputted by the master apparatus for authentication.

The invention provides an access authentication method for an electronic apparatus. The access authentication method includes protecting a data storage unit of the electronic apparatus with a predetermined key, receiving an access request that a master apparatus sends for accessing the data storage unit through a serial transmission interface, and determining whether the master apparatus is allowed to access the data storage unit according to the predetermined key and a key inputted by the master apparatus for authentication.

Based on the above, the electronic system, the electronic apparatus, and the access authentication method thereof, disclosed by the embodiments of the invention, protect the data storage unit of the slave apparatus with the predetermined key. Thus, when the master apparatus sends the access request for accessing the protected data storage unit, the slave apparatus performs authentication according to the key inputted by the master apparatus, so as to determine whether to allow the master apparatus to access the data storage unit. Hence, the slave apparatus executes the authentication mechanism on the access request of the master apparatus effectively by utilizing the transmission format of the serial transmission interface and achieves self protection of the slave apparatus without external control, thereby preventing a malicious or erroneous access operation of the master apparatus.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In order to eliminate the risk that a master apparatus may execute an erroneous access operation due to lack of a security authentication mechanism in an electronic system using Inter-IC bus, a slave apparatus of an embodiment of the invention utilizes a predetermined key to protect a data storage unit, such that when the master apparatus sends an access request to the protected data storage unit, the slave apparatus can determine whether to allow the master apparatus to access the data storage unit according to a key inputted by the master apparatus for authentication. Thereby, the slave apparatus of the embodiment of the invention can execute the access authentication mechanism to achieve the function of self protection without external control.

Figure 1:
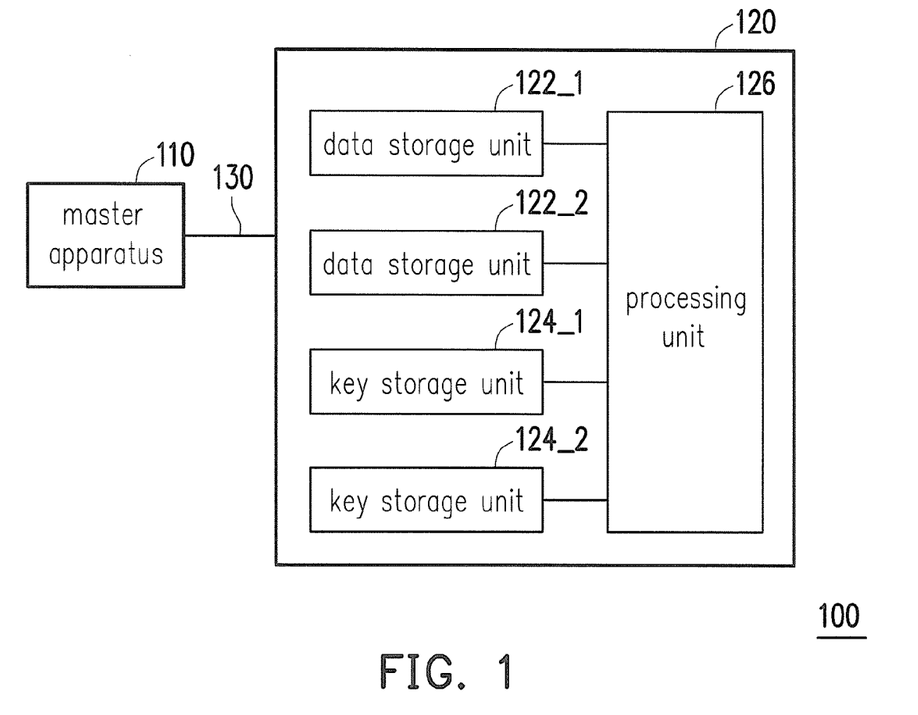
FIG. 1 is a block diagram illustrating an electronic system according to an embodiment of the invention.

FIG. 1 is a block diagram illustrating an electronic system according to an embodiment of the invention. With reference to FIG. 1, an electronic system 100 is an embedded system, such as a network switch, or a system, such as a mobile phone, a laptop computer, and a desktop computer, for example. The electronic system 100 includes at least one master apparatus and at least one slave apparatus. In this embodiment, a master apparatus 110 and a slave apparatus 120 are illustrated as an example to facilitate the following explanation. However, in other embodiments, the number of the master apparatuses and the number of the slave apparatuses are not limited to the illustration.

The master apparatus 110 is an electronic device or element having computing capability, such as a central processor, for example. The slave apparatus 120 is a programmable logic device or element, such as a complex programmable logic device (CPLD) and a field programmable gate array (FPGA), which is applied for indicator (e.g., LED) light control or fan or power source switch control, for example. The slave apparatus 120 is coupled to the master apparatus 110 through a serial transmission interface 130 for transmitting data. The serial transmission interface 130 is an Inter-IC bus or a serial peripheral interface (SPI), for example.

The slave apparatus 120 includes at least one data storage unit, at least one key storage unit, and a processing unit 126. To facilitate the explanation, two data storage units 122_1 and 122_2 and two key storage units 124_1 and 124_2 are illustrated in this embodiment. However, in other embodiments, the number of the data storage units and the number of the key storage units are not limited to the above.

The data storage units 122_1 and 1222 and the key storage units 124_1 and 124_2 are registers, for example. The data storage units 122_1 and 122_2 are configured for storing data, and the key storage units 124_1 and 124_2 are configured for storing an input key written by the master apparatus 110.

The processing unit 126 is coupled to the data storage units 122_1 and 122_2 and the key storage units 124_1 and 124_2. The processing unit 126 is a central processing unit (CPU) or other programmable microprocessors, for example. In this embodiment, the processing unit 126 is used for protecting the data storage unit 122_1 with a predetermined key, such that when the master apparatus 110 attempts to access the protected data storage unit 122_1, the slave apparatus 120 determines whether to allow the master apparatus 110 to access the protected data storage unit 122_1 by performing authentication on an access request of the master apparatus 110. To facilitate the explanation, the slave apparatus 120 is used in the following embodiment to describe how the processing unit 126 performs the access authentication mechanism.

Figure 2:
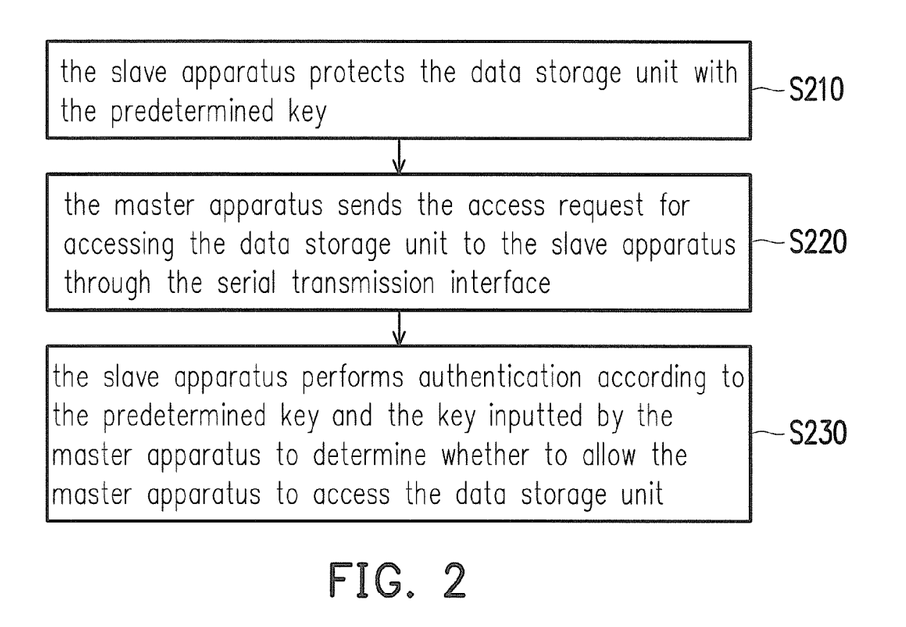
FIG. 2 is a flowchart illustrating an access authentication method of the electronic system according to an embodiment of the invention.

Details of the access authentication are explained below with reference to the aforementioned system configuration. FIG. 2 is a flowchart illustrating an access authentication method of the electronic system according to an embodiment of the invention, which is adapted for the electronic system 100 of FIG. 1. In this embodiment, the data storage unit 122_1 is protected by the slave apparatus 120, and the master apparatus 110 attempts to access the protected data storage unit 122_1 through the serial transmission interface 130, for example.

With reference to FIG. 1 and FIG. 2, in Step S210, the slave apparatus 120 protects the data storage unit 122_1 with the predetermined key. Specifically, in an embodiment, the predetermined key is set by hardware description language, such as Verilog or VHDL, for the slave apparatus 120 to protect the data storage unit 122_1. The predetermined key may have one or more bits, and the number of the bits thereof may correspond to a level of complexity of the access authentication. When the predetermined key is set to be more bits, the probability of occurrence of an erroneous access operation is reduced.

In Step S220, the master apparatus 110 sends the access request for accessing the data storage unit 122_1 to the slave apparatus 120 through the serial transmission interface 130, and in Step S230, the slave apparatus 120 performs authentication according to the predetermined key and the key inputted by the master apparatus 110, so as to determine whether to allow the master apparatus 110 to access the data storage unit 122_1.

To be more specific, after the slave apparatus 120 receives the access request sent by the master apparatus 110, the slave apparatus 120 determines whether the data is protected according to a data address corresponding to the access request. More specifically, in an embodiment, the master apparatus 110 notifies the slave apparatus 120 of the address corresponding to the data that the master apparatus 110 attempts to access by a transmission format of the access request, e.g., field information in the access request, such that the slave apparatus 120 obtains an access address that the master apparatus 110 attempts to access according to the field information in the access request and determines whether to perform authentication based on the key inputted by the master apparatus 110 according to the access address. The access address is the address of the data storage unit that the master apparatus 110 attempts to access, for example. In this embodiment, the access address refers to the data storage unit 122_1 protected by the predetermined key. However, in other embodiments, the access address may be the data storage unit 122_2 that is not protected.

The transmission format of the access request is explained hereinafter. Here, the serial transmission interface 130 is an Inter-IC bus, for example. The access request sent by the master apparatus 110 includes a plurality of pieces of field information, such as a start bit, a device address that the master apparatus 110 attempts to access (i.e., the address of the slave apparatus 120 in this embodiment), a read/write bit, an address offset, a data text to be transmitted, and a stop bit. The device address is the address of the slave apparatus 120, and the address offset is used to further determine for which register of the slave apparatus 120 the access request is sent. Therefore, the slave apparatus 120 obtains the access address from the device address and the address offset in the access request, for example.

Then, the slave apparatus 120 determines whether the data storage unit (e.g., the data storage unit 122_1) corresponding to the access address is protected through the access address, and further requests the master apparatus 110 to provide the input key for authentication when the slave apparatus 120 determines that the data storage unit 122_1 is protected. Specifically, in an embodiment, the master apparatus 110 respectively writes at least one input value corresponding to the access address in at least one key storage unit (e.g., at least one of the key storage units 124_1 and 124_2), so as to provide the input key.

It should be noted that the slave apparatus 120 obtains the input key provided by the master apparatus 110 before performing authentication according to the predetermined key and the input key, for example. Furthermore, in an embodiment, the slave apparatus 120 obtains the input key of the master apparatus 110 before receiving the access request sent by the master apparatus 110. In another embodiment, the access request sent by the master apparatus 110 includes the input key, such that the slave apparatus 120 obtains the input key when receiving the access request of the master apparatus 110. In addition, in other embodiments, the slave apparatus 120 may further obtain the input key of the master apparatus 110 after determining that the data storage unit 122_1 that the master apparatus 110 attempts to access is protected. In other words, the embodiments of the invention are not intended to limit when and how the slave apparatus 120 obtains the input key of the master apparatus 110 as long as the slave apparatus 120 obtains the input key of the master apparatus 110 before using the predetermined key to perform authentication on the access request of the master apparatus 110.

Moreover, it is worth noting that the bit number of the predetermined key may determine the number of the key storage units that the master apparatus 110 requires for writing the input value. Specifically, in an embodiment, if the predetermined key is one bit, the slave apparatus 120 may request the master apparatus 110 to write an input value in the key storage unit 124_1 to serve as the input key. In other embodiments, the input key may be generated through calculation or combination of a plurality of input values. For example, if the predetermined key is two bits, the slave apparatus 120 may request the master apparatus 110 to respectively write one input value in the key storage units 124_1 and 124_2 and generate the input key by calculating the two input values.

Regarding details of the process by which the slave apparatus 120 authenticates the predetermined key and the input key, the slave apparatus 120 may compare the predetermined key with the input key for authentication. When the predetermined key and the input key are consistent, the slave apparatus 120 decrypts the data storage unit 122_1 and allows the master apparatus 110 to access the data storage unit 122_1; and when the predetermined key and the input key are inconsistent, the slave apparatus 120 prohibits the master apparatus 110 from accessing the data storage unit 122_1.

Thereby, the slave apparatus 120 protects the data storage unit 122_1, and when the master apparatus 110 attempts to access the data storage unit 122_1, the slave apparatus 120 requests the master apparatus 110 to provide the input key corresponding to the data storage unit 122_1 for authentication. Once the master apparatus 110 passes the authentication, the slave apparatus 120 decrypts the data storage unit 122_1 for the master apparatus 110 to access the data storage unit 122_1. In other words, the slave apparatus 120 of the embodiment is provided with the access authentication mechanism for authentication of the master apparatus 110, so as to prevent erroneous access.

It should be noted that, in an embodiment, after the authentication is completed and the master apparatus 110 executes the access operation, the slave apparatus 120 further resets at least one key storage unit (e.g., at least one of the key storage units 124_1 and 124_2), so as to use the predetermined key to protect the data storage unit 122_1 and enable the access authentication mechanism again. Thereby, the master apparatus 110 is allowed to perform a one-time access on the data storage unit 122_1, and the protection that the slave apparatus 120 provides for the data storage unit 122_1 is enhanced.

Figure 3:
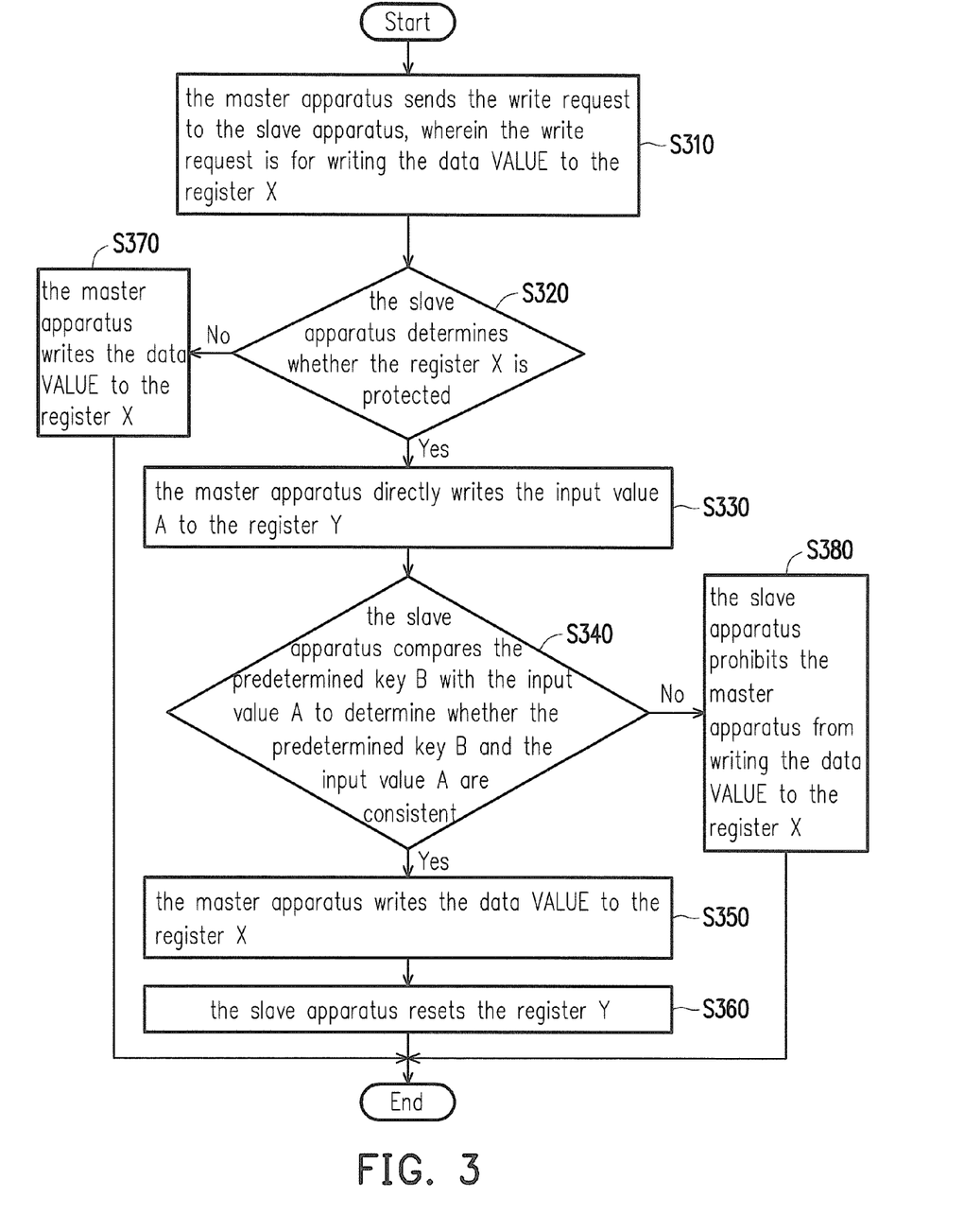
FIG. 3 is an example of an embodiment of the invention.

Below FIG. 3 is given as an example to explain the access authentication method of the electronic system 100 in an embodiment of the invention with reference to the components of the electronic system 100 of FIG. 1. Those applying this embodiment may modify the steps of FIG. 3 as appropriate according to their actual requirements. This embodiment illustrates a situation that the slave apparatus 120 uses a predetermined key B to protect a register X, and the master apparatus 110 attempts to write data VALUE to the register X and thus sends a write request.

With reference to FIG. 1 and FIG. 3, in Step S310, the master apparatus 110 sends the write request to the slave apparatus 120, wherein the write request is for writing the data VALUE to the register X. When the slave apparatus 120 receives the write request, in Step S320, the slave apparatus 120 determines whether the register X is protected. If the slave apparatus 120 determines that the register X is not protected, the slave apparatus 120 allows the master apparatus 110 to access the register X directly. Thus, in Step S370, the master apparatus 110 directly writes the data VALUE to the register X.

If the slave apparatus 120 determines that the register X is protected, the master apparatus 110 is required to write the input key to a designated register Y for the slave apparatus 120 to authenticate the write request of the master apparatus 110. It should be noted that, when the slave apparatus 120 determines that the register X is protected, the slave apparatus 120 may also obtain the predetermined key for protecting the register X. Below it is given that the predetermined key B corresponds to the register X, for example.

With reference to the flowchart of FIG. 3, in Step S330, the master apparatus 110 writes an input value A to the register Y. Then, in Step S340, the slave apparatus 120 compares the predetermined key B used for protecting the register X with the input value A written to the register Y by the master apparatus 110 to determine whether the predetermined key B and the input value A are consistent. In other words, in this embodiment, the input value A is equivalent to the input key provided by the master apparatus 110. If the predetermined key B and the input value A are consistent, the slave apparatus 120 allows the master apparatus 110 to access the register X. Thus, the process moves on to Step S350, in which the master apparatus 110 writes the data VALUE to the register X. Next, in Step S360, the slave apparatus 120 further resets the register Y to write Null to the register Y, such that the slave apparatus 120 protects the register X with the predetermined key B again. If the predetermined key B and the input value A are inconsistent, the process moves on to Step S380, and the slave apparatus 120 prohibits the master apparatus 110 from writing the data VALUE to the register X and ends the process of this embodiment.

Figure 4:
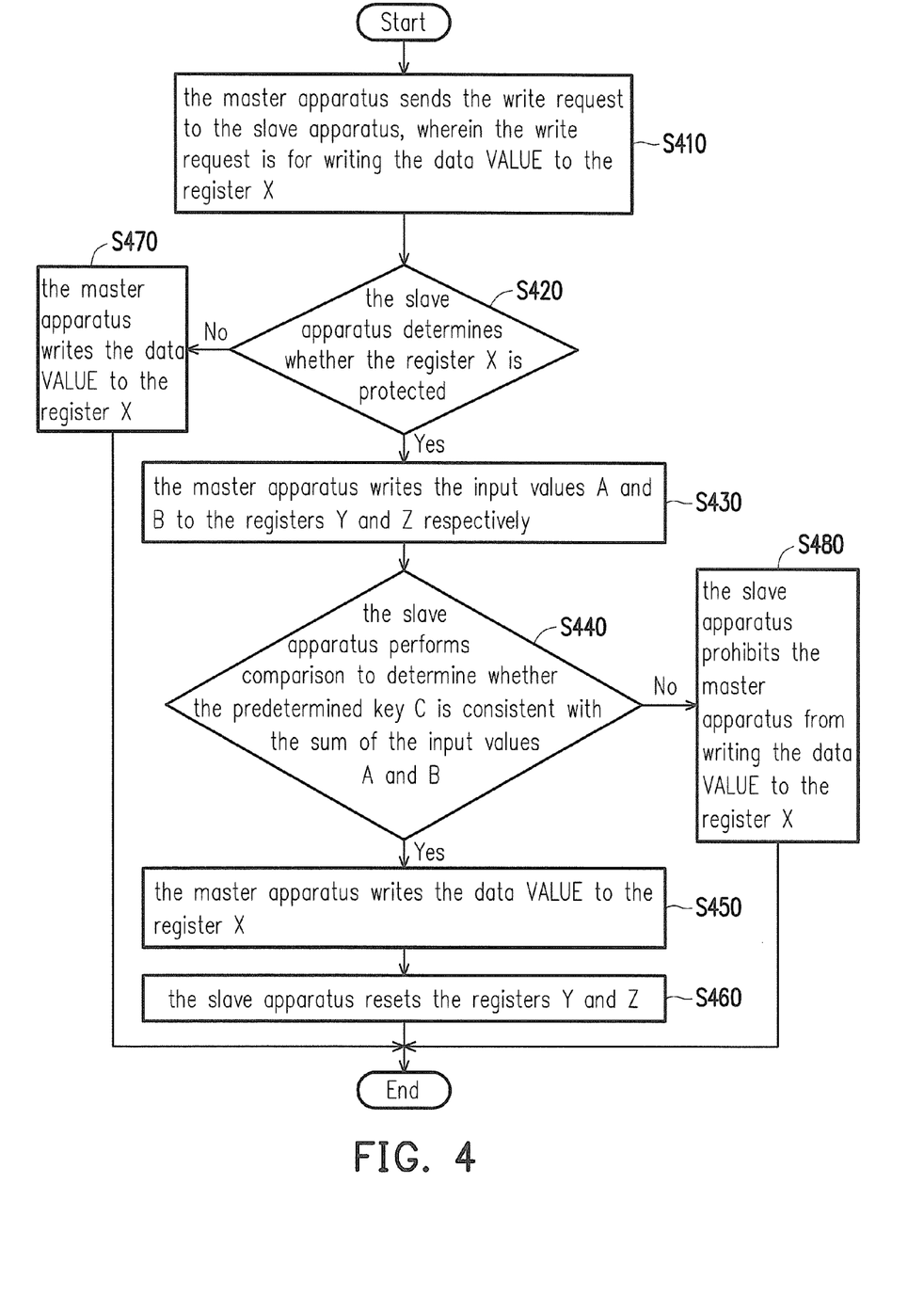
FIG. 4 is an example of an embodiment of the invention.

As for a more complex predetermined key, FIG. 4 is given as an example below to explain the access authentication method with reference to the components of the electronic system 100 of FIG. 1. Likewise, those applying this embodiment may modify the steps of FIG. 4 as appropriate according to their actual requirements. This embodiment illustrates a situation that the slave apparatus 120 uses a predetermined key C to protect the register X, and the master apparatus 110 attempts to write the data VALUE to the register X and thus sends the write request.

With reference to FIG. 1 and FIG. 4, in Step S410, the master apparatus 110 sends the write request to the slave apparatus 120. When the slave apparatus 120 receives the write request, in Step S420, the slave apparatus 120 determines whether the register X is protected. If the slave apparatus 120 determines that the register X is not protected, the slave apparatus 120 allows the master apparatus 110 to access the register X directly. Thus, in Step S470, the master apparatus 110 directly writes the data VALUE to the register X.

The above steps are similar to those of the previous embodiment. A difference is that, in this embodiment, when the slave apparatus 120 determines that the register X is protected, the master apparatus 110 is required to write the input key to designated registers Y and Z for the slave apparatus 120 to authenticate the write request of the master apparatus 110 by a combination of the values written to the registers Y and Z.

Therefore, in Step S430, the master apparatus 110 writes input values A and B to the registers Y and Z respectively. Thereafter, the slave apparatus 120 calculates the input values A and B, and in Step S440, the slave apparatus 120 performs comparison to determine whether the predetermined key C used for protecting the register X is consistent with a sum of the input values A and B. When they are consistent, the slave apparatus 120 allows the master apparatus 110 to access the register X. Thus, in Step S450, the master apparatus 110 writes the data VALUE to the register X. Next, in Step S460, the slave apparatus 120 resets the register Y to clear the values written to the registers Y and Z, so as to protect the register X with the predetermined key C again. If the predetermined key C and the sum of the input values A and B are inconsistent, in Step S480, the slave apparatus 120 prohibits the master apparatus 110 from writing the data VALUE to the register X and ends the process of this embodiment. Based on the above, in this embodiment, the sum of the input values A and B may be deemed as the input key provided by the master apparatus 110.

It should be noted that, in an embodiment, the slave apparatus 120 may further request the master apparatus 110 to respectively write the input values A and B to the corresponding registers Y and Z, and only this combination causes the slave apparatus 120 to decrypt the register X. In other embodiments, the slave apparatus 120 may calculate the input values A and B in other manners (to obtain a difference, a product, or a ratio thereof, for example). The invention is not intended to limit how the input values A and B are calculated or combined to obtain the input key for comparison with the predetermined key.

It should be noted that, according to the access authentication method of an embodiment of the invention, the access authentication mechanism may be temporarily disabled for temporarily shutting down the authentication function, such that the equipment staff who are around the electronic system 100 can perform the access operation without inputting the input key to be more convenient in use. More specifically, if the occurrence of an insertion event is used as a basis for determining whether the equipment staff are around the electronic system 100, in an embodiment, the slave apparatus 120 detects whether an external connection interface of the electronic system 100 is connected with an external apparatus. If the external connection interface is connected with the external apparatus, the slave apparatus 120 decrypts the data storage unit 122 and allows the master apparatus 110 to access the data storage unit 122 in a set time T. The external connection interface is a switch port, and the external apparatus is an optical fiber module, such as a small form-factor pluggable (SFP) module for photoelectric signal conversion, for example.

Figure 5:
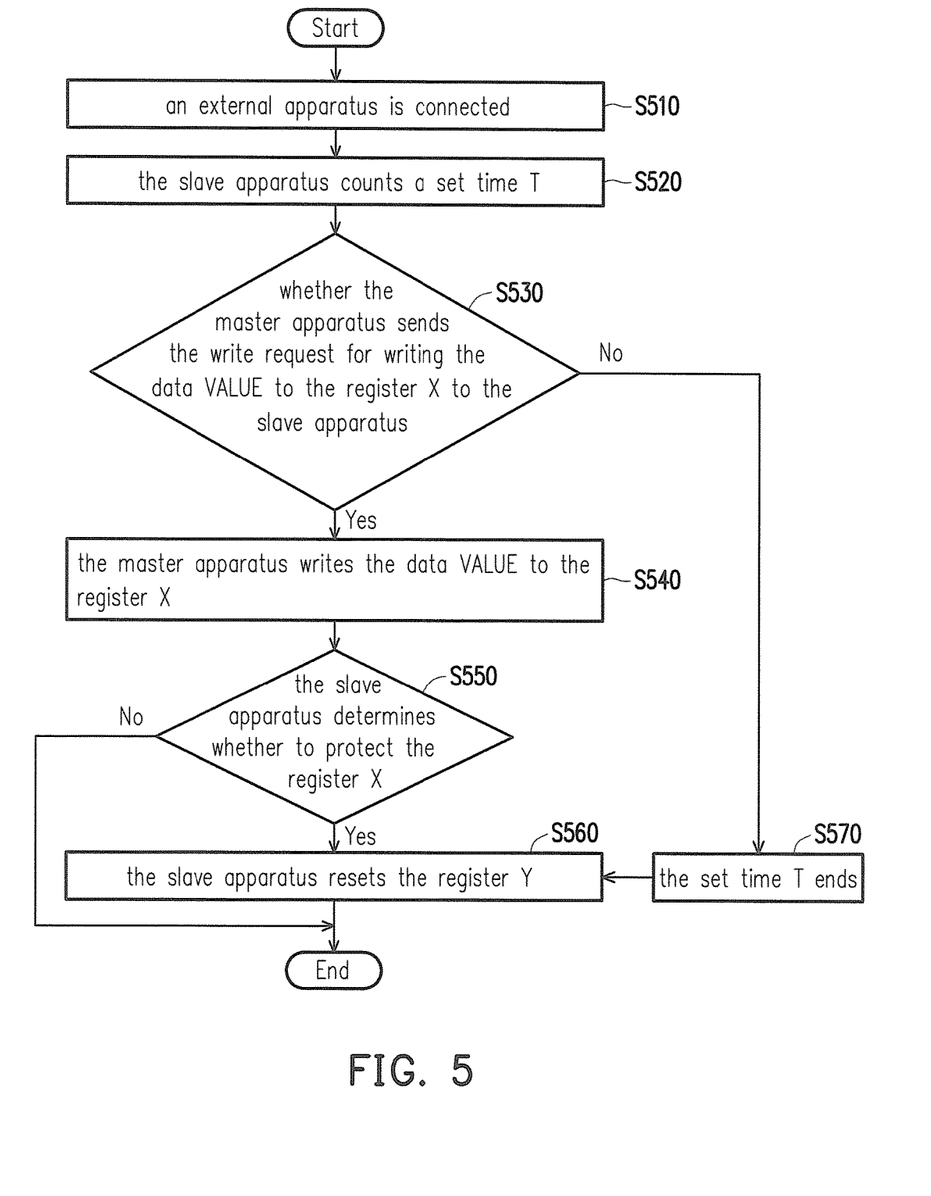
FIG. 5 is an example of an embodiment of the invention.

Below FIG. 5 is given as an example to explain the access authentication method of this embodiment, which is performed when the insertion event occurs, with reference to the components of the electronic system 100 of FIG. 1. Those applying this embodiment may modify the steps of FIG. 5 as appropriate according to their actual requirements. This embodiment illustrates a situation that the slave apparatus 120 uses the predetermined key B to protect the register X, and when the master apparatus 110 sends the write request with respect to the register X, the slave apparatus 120 designates the master apparatus 110 to write the input value to the register Y for authentication.

With reference to FIG. 1 and FIG. 5, the slave apparatus 120 detects whether the external connection interface is connected with the external apparatus, and in Step S510, determines that the slave apparatus 120 is connected with the external apparatus. Then, in Step S520, the slave apparatus 120 counts the set time T with use of a time counting unit, for example, and decrypts the register X, so as to allow the master apparatus 110 to access the register X in the set time T. The slave apparatus 120 writes the input value A, which is consistent with the predetermined key B, to the register Y, for example, so as to decrypt the register X.

Thereafter, the slave apparatus 120 detects in the set time T whether the write request the master apparatus 110 sends for writing the register X is received. Therefore, in Step S530, the slave apparatus 120 determines whether the master apparatus 110 sends the write request for writing the data VALUE to the register X to the slave apparatus 120. When the slave apparatus 120 receives the write request of the master apparatus 110, since the register X has been decrypted, in Step S540, the master apparatus 110 is allowed to directly write the data VALUE to the register X.

When the writing ends, in Step S550, the slave apparatus 120 further determines whether to protect the register X. In this embodiment, because the register X is previously protected by the predetermined key B, in Step S560, the slave apparatus 120 resets the register Y, so as to protect the register X with the predetermined key B again. Further, in Step S570, if the slave apparatus 120 does not receive the write request the master apparatus 110 sends for the register X when the set time T ends, the slave apparatus 120 also executes Step S560 to reset the register Y, so as to enable the authentication mechanism for the register X again. As for the situation where the register X has not been protected by the predetermined key, Step S560 is omitted and the process of this embodiment is ended.

Accordingly, the slave apparatus 120 of this embodiment allows the master apparatus 110 to perform a one-time access on the specific register X in the slave apparatus 120 without authentication in the set time after detecting the insertion event, so as to facilitate the operation. For the protected register X, after the master apparatus 110 completes the access operation, the register X is protected again in this embodiment, so as to continue the protection of the register X.

It should be noted that, in other embodiments, the access of the master apparatus 110 to the register X is not necessarily a one-time access. For example, the slave apparatus 120 may write the input value A, which is consistent with the predetermined key B, to the register Y in Step S560. In that case, the master apparatus 110 is allowed to access the register X more than one time in the set time T without authentication.

To conclude the above, the electronic system, the electronic apparatus, and the access authentication method thereof, disclosed by the embodiments of the invention, protect the data storage unit of the slave apparatus with the predetermined key. When the master apparatus sends the corresponding access request in an attempt to access the protected data storage unit, the slave apparatus performs authentication according to the key inputted by the master apparatus, so as to determine whether to allow the master apparatus to access the data storage unit. Accordingly, the slave apparatus executes the authentication mechanism on the access request of the master apparatus effectively by utilizing the transmission format of the serial transmission interface. In addition, with different settings of the predetermined key, the complexity of the authentication mechanism is increased to improve self protection of the slave apparatus. An embodiment of the invention further provides the function of temporarily disabling the authentication mechanism to facilitate the operation of the equipment staff.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An access authentication method of an electronic apparatus, the access authentication method comprising:
    protecting a data storage unit of the electronic apparatus with a predetermined key;
    receiving an access request that a master apparatus sends for accessing the data storage unit through a serial transmission interface;
    obtaining an access address according to at least one piece of field information in the access request and determining whether an input key inputted by the master apparatus is required for authentication according to the access address;
    determining whether to allow the master apparatus to access the data storage unit according to the predetermined key and the input key for authentication, comprising
        comparing the predetermined key with the input key;
        decrypting the data storage unit to allow the master apparatus to access the data storage unit when the predetermined key is consistent with the input key; and
        prohibiting the master apparatus from accessing the data storage unit when the predetermined key is inconsistent with the input key,
    wherein the serial transmission interface is an Inter-IC bus or a serial peripheral interface (SPI),
    wherein the electronic apparatus further comprises at least one key storage unit, and the access authentication method further comprises the following before the step of performing authentication according to the predetermined key and the input key:
        receiving at least one input value respectively written by the master apparatus corresponding to the access address through the at least one key storage unit to obtain the input key.

2. The access authentication method according to claim 1, wherein the step of obtaining the input key further comprises:
    performing calculation on the at least one input value to generate the input key.

3. The access authentication method according to claim 1, wherein after the step of determining whether to allow the master apparatus to access the data storage unit according to the predetermined key and the input key for authentication, the access authentication method further comprises:
    resetting the at least one key storage unit to protect the data storage unit with the predetermined key again.

4. The access authentication method according to claim 1, further comprising:
    detecting whether an external apparatus is connected through an external connection interface; and
    decrypting the data storage unit to allow the master apparatus to access the data storage unit in a set time when the external connection interface is connected with the external apparatus.

5. The access authentication method according to claim 4, wherein the step of allowing the master apparatus to access the data storage unit in the set time comprises:
    resetting the at least one key storage unit according to the master apparatus accessing the data storage unit.

6. An electronic system, comprising:
    a master apparatus; and
    a slave apparatus coupled to the master apparatus through a serial transmission interface and comprising a data storage unit protected by the slave apparatus with a predetermined key,
    wherein the master apparatus sends an access request for accessing the data storage unit to the slave apparatus through the serial transmission interface, and the slave apparatus performs authentication according to the predetermined key and an input key of the master apparatus to determine whether to allow the master apparatus to access the data storage unit, wherein the serial transmission interface is an Inter-IC bus or a serial peripheral interface (SPI),
    wherein the slave apparatus obtains an access address according to at least one piece of field information in the access request and determines whether the input key is required for authentication according to the access address, the slave apparatus further comprises at least one key storage unit, and the master apparatus respectively writes at least one input value corresponding to the access address in the at least one key storage unit to provide the input key, and
    wherein the slave apparatus compares the predetermined key with the input key, wherein when the predetermined key is consistent with the input key, the slave apparatus decrypts the data storage unit to allow the master apparatus to access the data storage unit; and when the predetermined key is inconsistent with the input key, the slave apparatus prohibits the master apparatus from accessing the data storage unit.

7. The electronic system according to claim 6, wherein the slave apparatus further performs calculation on the at least one input value to generate the input key.

8. The electronic system according to claim 6, wherein the slave apparatus further resets the at least one key storage unit to protect the data storage unit with the predetermined key again.

9. The electronic system according to claim 6, wherein the slave apparatus further detects whether an external apparatus is connected through an external connection interface, wherein when the external connection interface is connected with the external apparatus, the slave apparatus decrypts the data storage unit to allow the master apparatus to access the data storage unit in a set time.

10. The electronic system according to claim 9, wherein the slave apparatus resets the at least one key storage unit according to the master apparatus accessing the data storage unit in the set time.

11. An electronic apparatus, comprising:
a data storage unit; and
a processing unit coupled to the data storage unit, and protecting the data storage unit with a predetermined key and receiving an access request that a master apparatus sends for accessing the data storage unit through a serial transmission interface, and the processing unit determining whether to allow the master apparatus to access the data storage unit according to the predetermined key and a key inputted by the master apparatus for authentication, wherein the serial transmission interface is an Inter-IC bus or a serial peripheral interface (SPI), wherein the processing unit obtains an access address according to at least one piece of field information in the access request and determines whether the input key is required for authentication according to the access address, the electronic apparatus further comprises at least one key storage unit, and the master apparatus respectively writes at least one input value corresponding to the access address in the at least one key storage unit to provide the input key, wherein the processing unit compares the predetermined key with the input key, wherein when the predetermined key is consistent with the input key, the processing unit decrypts the data storage unit to allow the master apparatus to access the data storage unit; and when the predetermined key is inconsistent with the input key, the processing unit prohibits the master apparatus from accessing the data storage unit.

* * * * *